(12) United States Patent
Folkerts

(10) Patent No.: US 11,003,058 B2
(45) Date of Patent: May 11, 2021

(54) CAMERA MOUNTING SYSTEM

(71) Applicant: IWON, Inc., Albia, IA (US)

(72) Inventor: Tim Folkerts, Albia, IA (US)

(73) Assignee: IWON, Inc., Albia, IA (US)

( * ) Notice: Subject to any disclaimer, the term of this patent is extended or adjusted under 35 U.S.C. 154(b) by 177 days.

(21) Appl. No.: 16/176,822

(22) Filed: Oct. 31, 2018

(65) Prior Publication Data

US 2019/0129283 A1    May 2, 2019

Related U.S. Application Data

(60) Provisional application No. 62/579,596, filed on Oct. 31, 2017.

(51) Int. Cl.
*G03B 17/56* (2021.01)
*F16M 11/06* (2006.01)
*F16M 13/02* (2006.01)

(52) U.S. Cl.
CPC ........... *G03B 17/561* (2013.01); *F16M 11/06* (2013.01); *F16M 13/022* (2013.01)

(58) Field of Classification Search
CPC ......... B62J 9/10; B62J 9/20; B62J 9/21; B62J 9/22; B62J 9/27; B62J 11/00
USPC .......................... 396/419; 248/689; 224/461
See application file for complete search history.

(56) References Cited

U.S. PATENT DOCUMENTS

| | | | |
|---|---|---|---|
| 2010/0097789 A1* | 4/2010 | Sharrah | F41G 11/003 362/110 |
| 2018/0020130 A1* | 1/2018 | Harden | F16M 11/10 |
| 2019/0009850 A1* | 1/2019 | Peters | B62J 11/00 |

* cited by examiner

*Primary Examiner* — Clayton E. LaBalle
*Assistant Examiner* — Fang-Chi Chang
(74) *Attorney, Agent, or Firm* — Standley Law Group LLP

(57) ABSTRACT

A device for mounting an action camera to a protrusion includes a fastener and a mounting arm configured to be secured to the action camera. The mounting arm has a first opening configured to accommodate a fastener. An upper bracket has a second opening positioned to be aligned with the first opening and configured to accommodate the fastener. A lower bracket is configured to be selectively secured to the upper bracket. The upper bracket and the lower bracket are configured to surround and frictionally engage the protrusion.

17 Claims, 8 Drawing Sheets

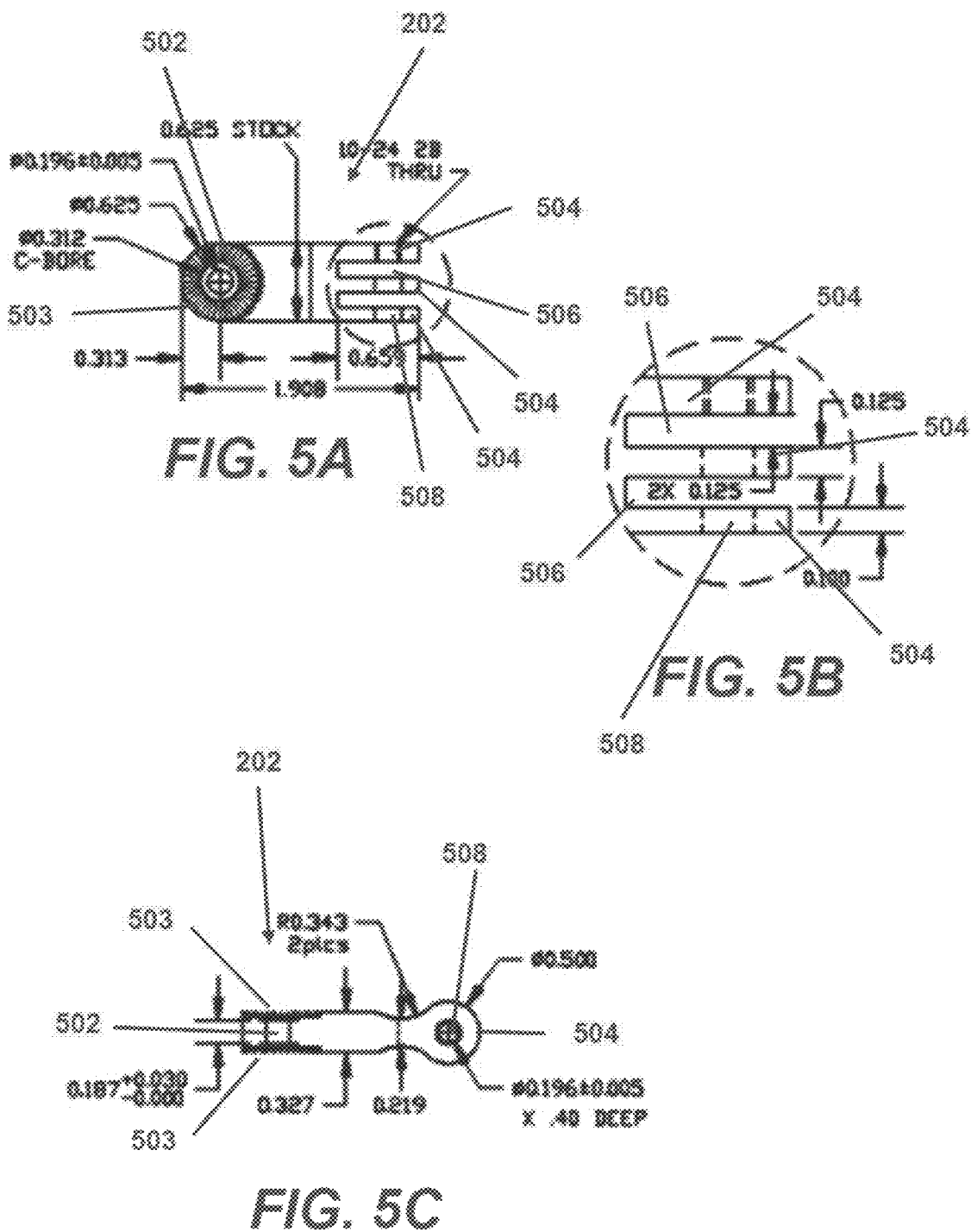

CAMERA MOUNTING SYSTEM

CROSS-REFERENCE TO RELATED APPLICATION

This application claims the benefit of U.S. Provisional Application Ser. No. 62/579,596 filed Oct. 31, 2017, the disclosures of which are hereby incorporated by reference in their entireties.

TECHNICAL FIELD

Exemplary embodiments of the present invention relate generally to a system for affixing rugged cameras (referred to herein as "action cameras") to various structures.

BACKGROUND AND SUMMARY OF THE INVENTION

Action cameras such as the GoPro® Hero® (www.gopro.com) are ruggedized, high performance point and shoot style cameras that sometimes are configured to capture images upon demand, at set intervals, or to capture continuous or periodic video recordings. These action cameras have become very common and are used by many to record activities where non-ruggedized cameras would likely be damaged by water, impact, vibration or other conditions for which they are not adequately designed. Action cameras are frequently designed to accommodate an accessory enclosure or mount which permits their attachment to the bodies of those participating in sporting or recreational activities, for example. Other attachment points for such mounts include helmets, animals, bicycles, sports equipment, goal posts, other fixed structures, vehicles, equipment, and the like. The previous list is intended to illustrate some of the applications for action cameras but is not intended to be comprehensive.

A common feature of many mounts for action camera, and for action cameras in general, is the use of an adjustable mounting system that permits the action camera to be mounted in a manner which permits the action camera to be directed at one or more desired points of focus. These action camera mounts frequently use a series of articulated joints that are held in position by interlocking teeth and the compressive force of a fastener. These mounts are generally made of a plastic material. In order to adjust the focal point of the camera, a user must generally loosen a fastener, adjust a joint of the mount, and retighten the fastener. Generally, the fasteners for action camera are designed with a knurled end or knob that is designed to permit a user to grasp the knob for tightening. Because of their intended use, action cameras are frequently subject to high levels of shock and vibration. In order to reduce this vibration, users frequently tighten the mounting fasteners to the point of failure, stripping the threading of the mounting fasteners, damaging the mounting points, or both.

What is needed is a mounting system and associated hardware that permits a user to securely mount an action camera to various structures in a manner that prevents or minimizes vibration of the action camera. An embodiment of the inventive device may comprise one or more robust joint structures which allow adjustments across several axes of adjustment, so as to permit a user to align the action camera such that a desired image or video may be captured. Also needed is a fastener that is sufficiently robust to be tightened in a way which minimizes the movement of the action camera mount. An embodiment of such a fastener may be configured so as to allow for finger tightening, tool-based tightening or to allow tightening and adjustment using a flat structure such as, but not limited to, a coin.

The brief summary presented above is intended only to familiarize the reader with certain aspects and contexts of embodiments of the present disclosure without limitation to the claimed subject matter. Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 5A is top view of an exemplary mounting arm of FIG. 2;

FIG. 5B is a detailed top view of the mounting arm of FIG. 5A;

FIG. 5C is a side view of the mounting arm of FIG. 5A;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
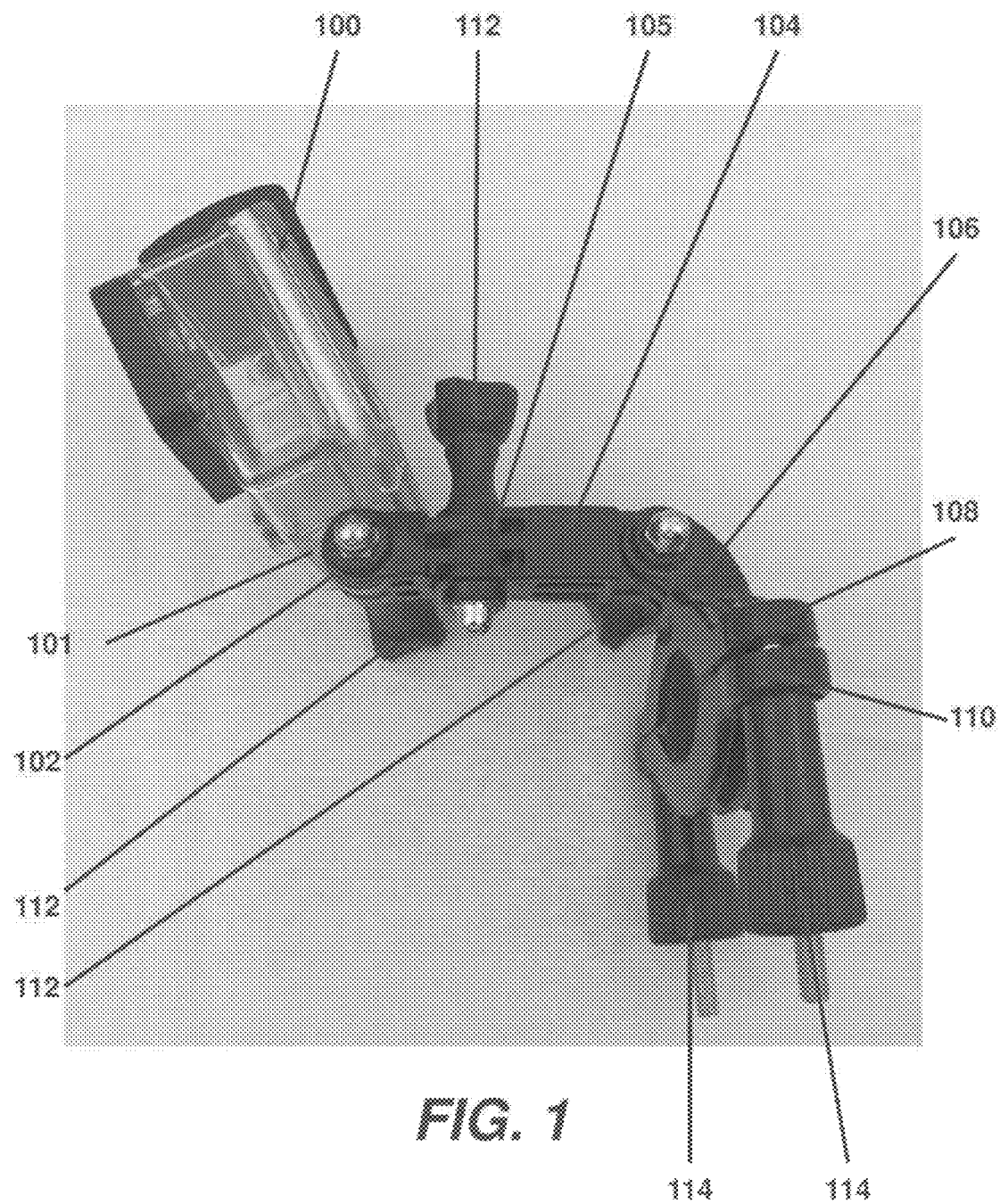
FIG. 1 is an illustration of a known action camera mounting system.

As illustrated in FIG. 1, known embodiments of action camera mounting systems include a camera housing 100 that includes a mounting point 101 for attachment to a variety of brackets. As illustrated, a mounting bracket extension arm 102 may be flexibly attached to the mounting point 101. As illustrated, a second extension 104 may be provided to add an articulation point 105 where this second extension may be attached to an articulation point 106 formed into an upper bracket portion 108. This upper portion may be affixed to a lower portion 110 to trap a bar or other portion of a vehicle, bicycle or other structure (not shown). As is illustrated, fixing hardware 112 and 114 may be employed to secure the articulation points and the upper and lower bracket components (108 and 110). Because the articulation points are frequently required to be adjusted during the mounting or use of action cameras in order to position the view of the action camera such that the desired images are captured, the fixing hardware for articulation points 105 is frequently supplied with hardware 112 configured with grips, facets or wings. These are intended to provide a user with a sufficient surface area to permit the hardware 112 to be securely tightened. Unfortunately, the weight of the action camera installed in the camera housing may be such that the mass of the action camera combined with the vibration that may be applied to the clamps (108 and 110) may cause the camera to vibrate, distorting or otherwise interfering with the action camera's ability to clearly capture an image. In addition to such vibration, the articulation points may become loose or otherwise disturbed such that the action camera may be displayed such that the images captured may not be those that the user desires.

Figure 2:
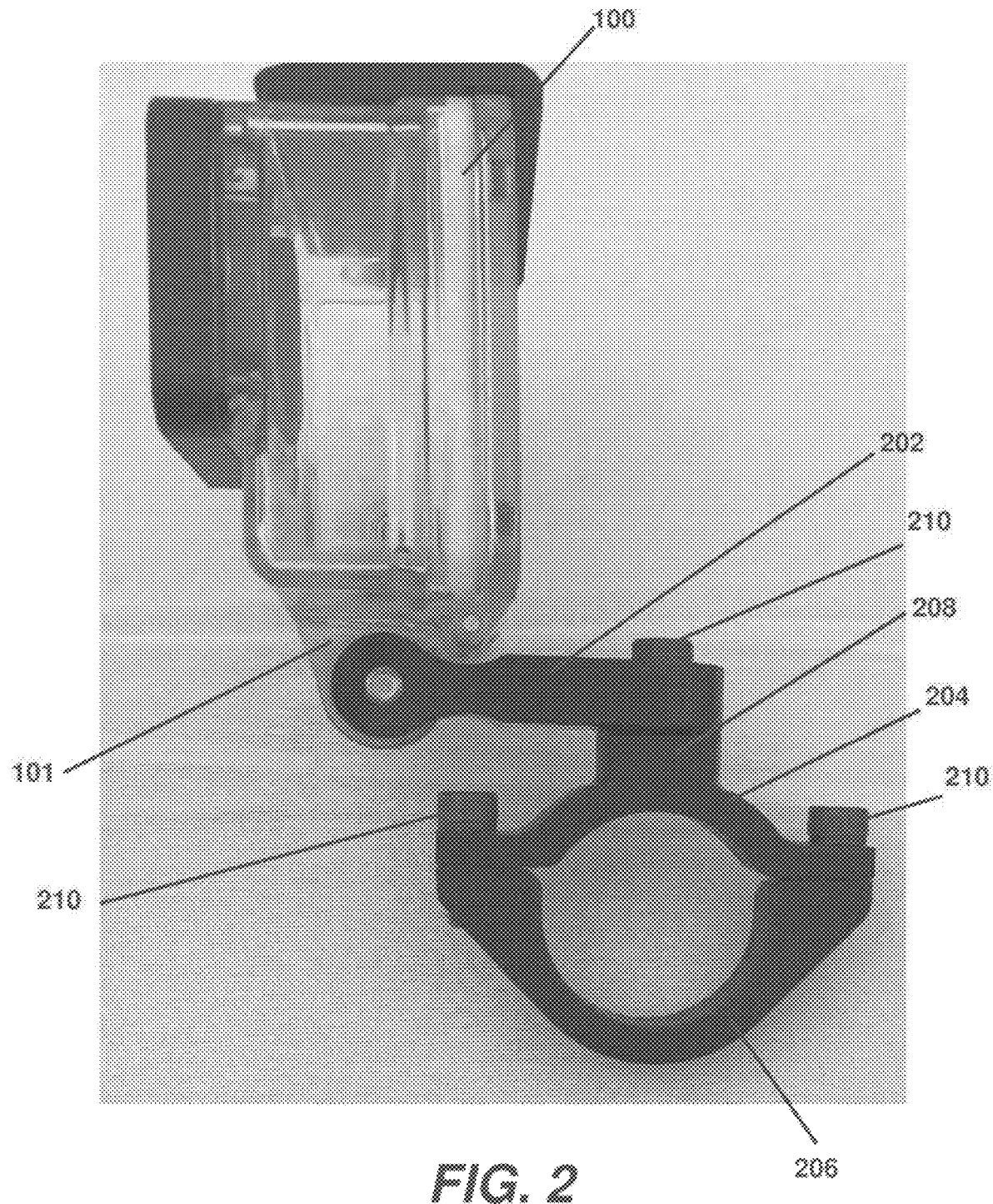
FIG. 2 is an illustration of an exemplary embodiment of the invention shown attached to an action camera housing.

As illustrated in FIG. 2, in an embodiment of the invention, a camera housing 100 may still be employed to provide a mounting point 101 for attachment of the action camera. Such a mounting point may be affixed to a mounting arm 202 which may be affixed to an upper bracket 204 which may be affixed to a lower bracket 206. As illustrated, the mounting arm 202 may be affixed to a raised portion 208 of the upper bracket 204, though such is not required. The raised portion 208 may be formed from aluminum, titanium, or other metal materials such that the mounting portion 208 is capable of supporting the mounting arm 202. In an exemplary embodiment of the invention, the raised portion 208 is approximately as wide as the width of the mounting arm 202 so as to provide support to the mounting arm 202 and thus the camera housing 100.

Figures 3A, 3B:
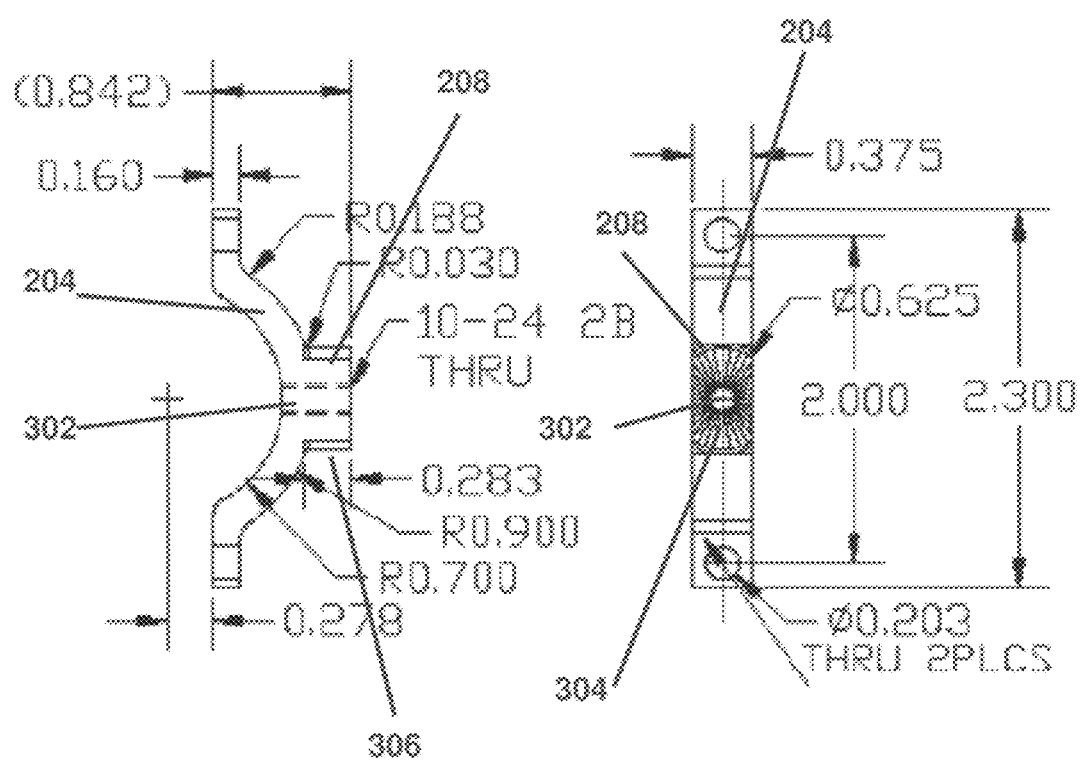
FIG. 3A is a side view of a top portion of an exemplary bracket of FIG. 2.
FIG. 3B is a top view of the top portion of the bracket illustrated in FIG. 3A.

As is illustrated in FIGS. 3A and 3B, the upper bracket 204 may comprise the raised portion 208 which may further comprise an opening 302. In exemplary embodiments, the opening 302 may be sized to accommodate a fastener 210. Additionally, or alternatively, the opening 302 may be threaded to accommodate a threaded fastener 210. The raised portion 208 may be surrounded by a set of engagement ridges 304. These engagement ridges 304 may extend radially from the opening 302. The engagement ridges 304 may be configured to engage with corresponding mating ridges 503 found in the mounting arm 202. The engagement ridges 304 and the mating ridges 503 may be configured to frictionally engage one another, particularly when compressed together, to prevent or reduce the likelihood that the mounting arm undesirably rotates in relation to the mounting bracket.

Referring again to FIG. 2, a fastener 210 may be employed to attach the arm 202 to the upper bracket 204. As will be explained in greater detail herein, the fastener 210 may be secured with a fastener tool or wrench 800 such that the fastener 210 may be tightened more securely than those of known embodiments which rely on finger pressure or hand strength for tightening. As is also illustrated, the raised mounting portion 208 may be configured such that it is less subject to stress than mounting portions in known embodiments. As an example of how such portions may be configured, the raised portion 208 illustrated is formed with substantially vertical sides 306 that maximize the amount of bracket material available to strengthen the raised portion 208.

Figure 4A:
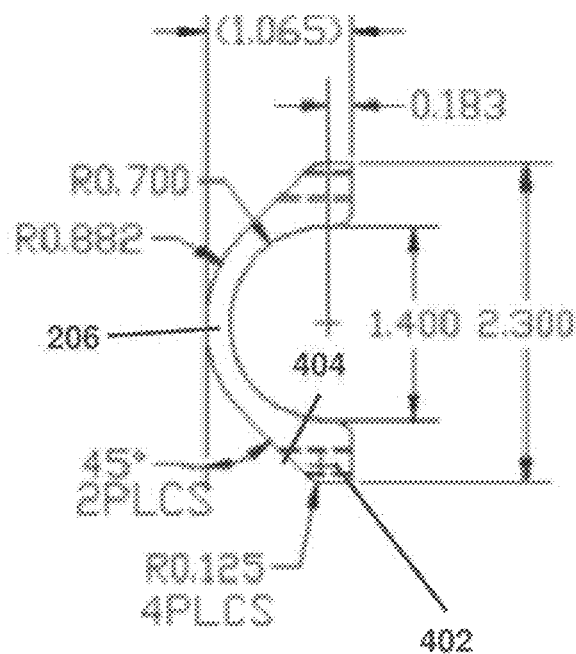
FIG. 4A is a side view of a bottom portion of an exemplary bracket of FIG. 2.
Figure 4B:
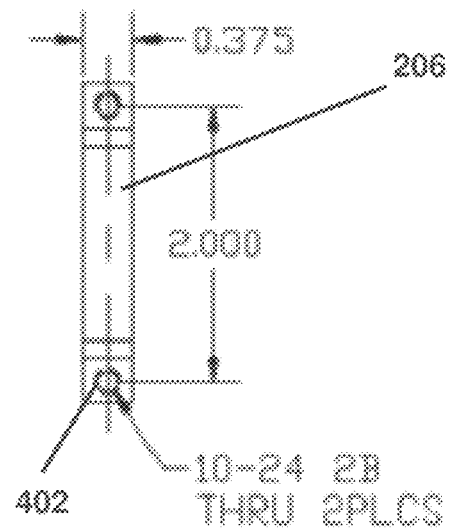
FIG. 4B is a top view of the of the bottom portion of the bracket of FIG. 4A.

In addition to the raised mounting portion 208 found in the upper bracket 204, embodiments of the invention also comprise other strengthening components. As is illustrated in FIG. 4A, one or more fastener holes 402 may be formed in the lower bracket 206. As is illustrated, this portion of the bracket 206 may be formed with a radius or enlarged thickness 404. This enlargement may serve two purposes. The first being to allow for an elongated fastener hole 402. This elongated fastener hole 402 may serve to provide for greater thread engagement with a fastener 210, reducing the likelihood of damage to the fastener 210 or bracket threads. In addition to providing greater thread engagement, the elongated hole 402 may also serves to reduce the protrusion of the fastener 210 from the bracket. Particularly in applications involving automobiles or other vehicles, there is a likelihood of damage to the fastener 210 threading as the result of debris from the road or snagging on grass and other debris for off-road applications. Additionally, the protrusion of the fastener 210 may cause injury to a user coming into contact with the fastener 210, such as during a fall or crash.

As is illustrated, in FIGS. 5A-5D, the mounting arm 202 may comprise a fastener hole 502 that may be surrounded with raised mating ridges 503 that mate with complementary engagement ridges 304 found in the upper mounting bracket 204. As was noted previously, these mating ridges 503 and engagement ridges 304 may serve to prevent the mounting arm 202 from undesirably rotating or otherwise moving with regard to the upper mounting bracket 204 during use.

As illustrated in the enlarged drawing portion shown in FIG. 5B, a series of interlocking tabs 504 may be formed at an end of the mounting arm 202. These tabs 504 may be positioned to form spaces 506 between the respective tabs 504. As illustrated in FIG. 2, these tabs 504 may be configured to engage the mounting point 101 of the action camera housing 100. A fastener 210 may be inserted through a hole 508 formed through the tabs 504. The fastener 210 may be tightened to cause the tabs 504 to engage with the mounting point 101 to secure the camera housing 100 in a desired orientation or position.

Figure 6A:
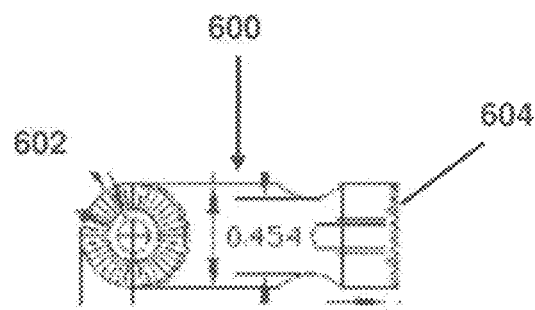
FIG. 6A is a top view of an exemplary extension arm.
Figure 6B:
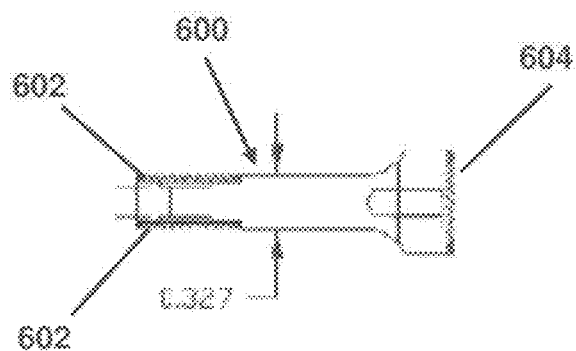
FIG. 6B is a side view of the extension arm of FIG. 6A.
Figure 6C:
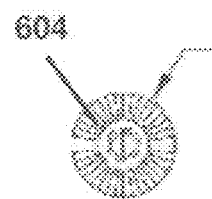
FIG. 6C is a front view of the extension arm of FIG. 6A.
Figure 7A:
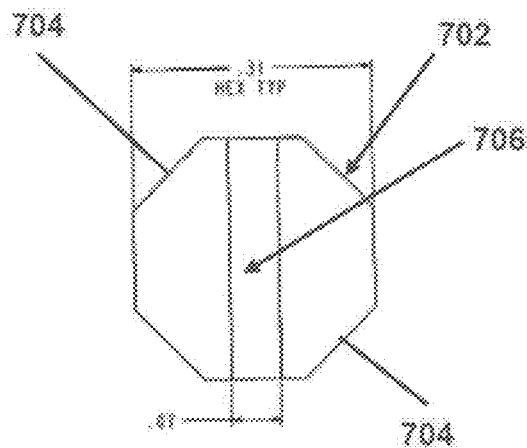
FIG. 7A is a top view of an exemplary fastener for use with the device of FIG. 2.
Figure 7B:
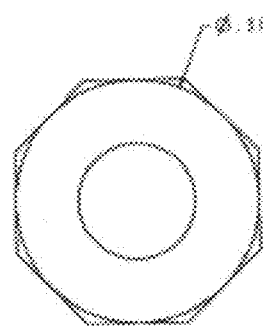
FIG. 7B is a bottom view of the fastener of FIG. 7A.
Figure 7C:
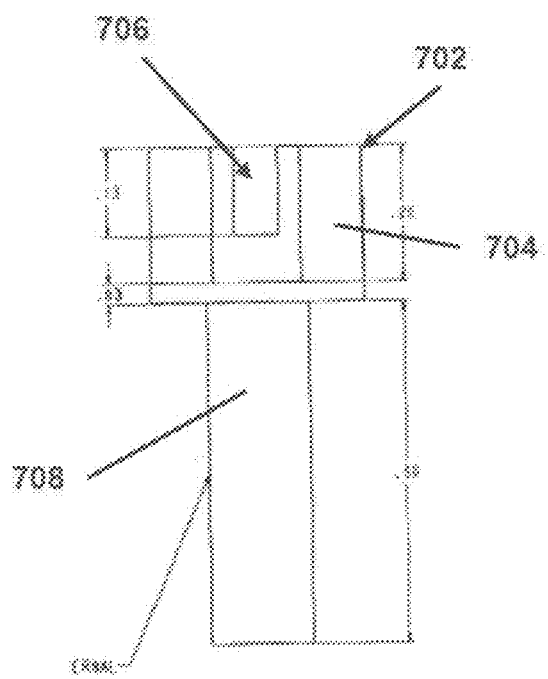
FIG. 7C is a side view of the fastener of FIG. 7A.
Figure 7D:
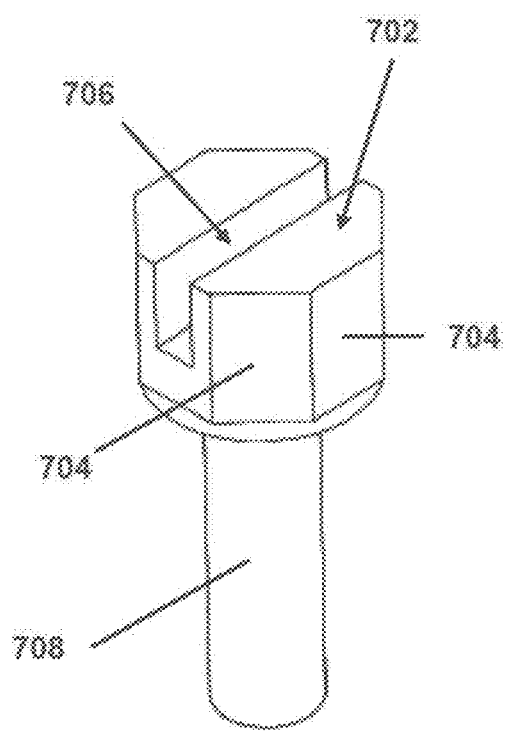
FIG. 7D is a perspective view of the fastener of FIG. 7A.

Additional varieties of mounting arms 202 may be configured for use with embodiments of the invention. For example, the length of the mounting arm 202 may be varied without departing from the spirit of the invention. Additionally, embodiments of the invention contemplate the use of other mounting arm 202 configurations such as mounting arms 202 that comprise raised ridges 502, 304 at each end of the mounting arm 202. An example of such an embodiment is illustrated in FIGS. 6A-6C. As is shown, such an exemplary arm 600 may comprise a first interlocking tab section 602 and a second interlocking tab section 604. Either the first 602 or the second 604 interlocking section may be positioned to interface with the interlocking tabs 504 of the mounting arm 202 of FIGS. 5A-5D previously described. Additionally, either interlocking tab section 602 or 604 of the arm 600 may be connected to additional arm to create an elongated arm with multiple articulation points. It is contemplated that such arms may be "stacked", that is, positioned such that a single fastener 210 could be affixed to multiple arms. Such a configuration may permit more than one arm (and thus more than one camera) to be connected to an upper mounting bracket 204 or to other arms. Such a configuration may be beneficial in situations such as a forward and rearward facing camera that is mounted to a single surface or vehicle frame member.

As is illustrated in FIG. 1, known embodiments of fasteners comprise a series of tabs or wings that permit a user to grip the fastener for tightening. When an action camera is used in certain environments prone to substantial shock and vibration, finger or hand tightening of the fasteners may not be sufficient to fully secure an action camera in place.

In certain embodiments of the invention, fasteners 210 may be fabricated with a series of facets 704 that permit a user to initially finger tighten the fastener 210 and then switch to a wrench 800 in order to permit the fastener 210 to be more fully tightened. As is illustrated in FIGS. 7A-D, the fastener 210 may have an enlarged head 702 that comprises facets 704 for finger or hand gripping. Once finger-tight or hand-right, the wrench 800 may be applied to the fastener 210 to fully tighten the fastener 210. Alternatively, the fasteners 210 may be tightened using the wrench 800 alone. The fasteners 210 may comprise a shank 708 which may extend from the head 702 various distances. The shank 708 may be threaded or unthreaded. Additionally, or alternatively, the shank 708 may comprise a pointed section.

Figures 8A, 8B:
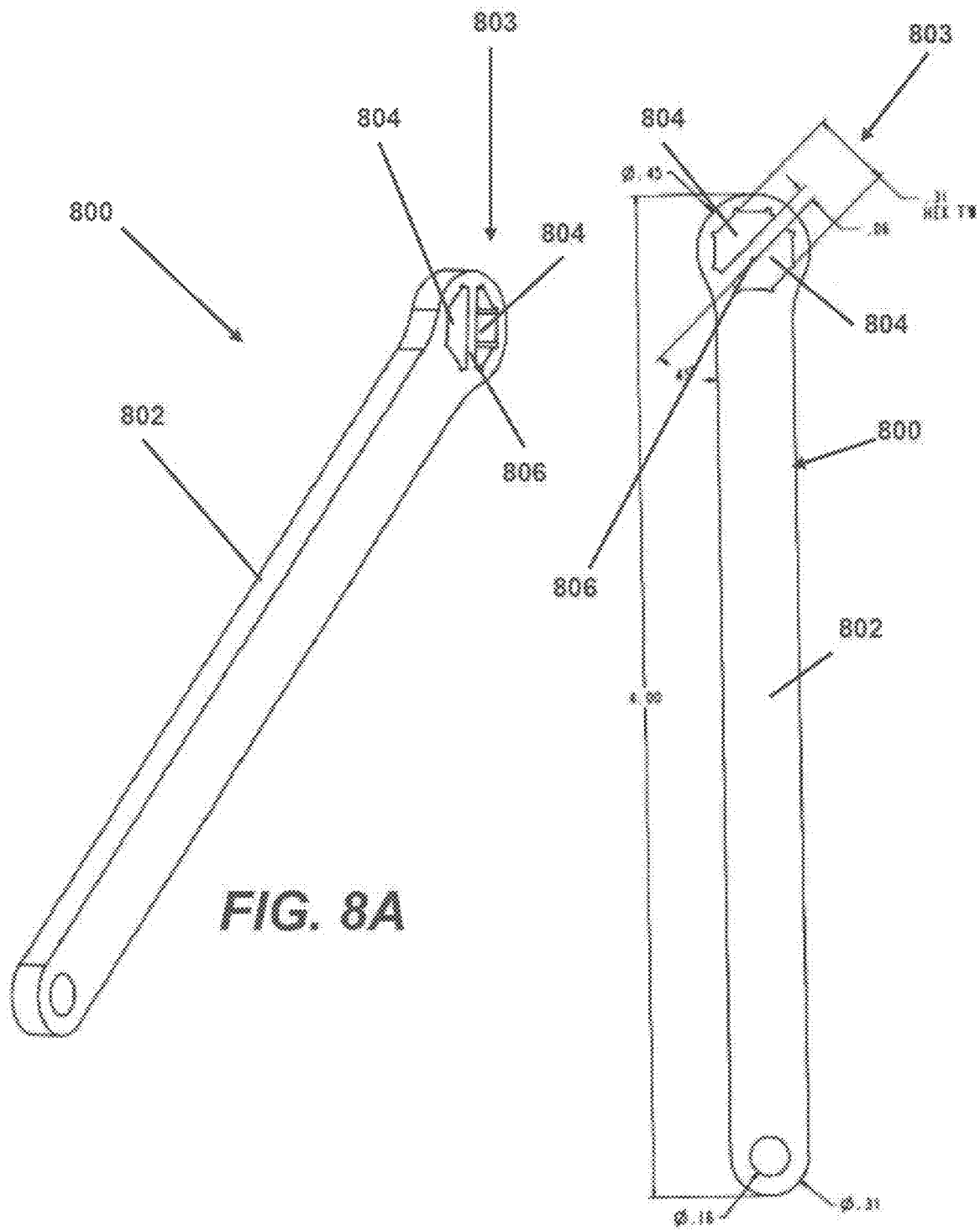
FIG. 8A is a perspective view of an exemplary wrench for use with the device of FIG. 2, including the fastener of FIGS. 7A through 7D.
FIG. 8B is a top view of the wrench of FIG. 8A.

An illustration of such a wrench 800 is shown in FIGS. 8A-B. As shown, the wrench 800 may have an elongated handle 802, a head 803 with a first and second openings 804, though any number of openings is contemplated. In exemplary embodiments, the head 803 is substantially circular in shape and the openings 804 are substantially semi-circular in shape, though any shape of head 803 and openings 804 are contemplated. Regardless, the openings 804 may define a slat 806 which may extend across the head 803. The first and second openings 804 and the slat 806 may be configured to engage the enlarged head 702 and facets 704 of the fastener 210. Additionally, the fastener 210 may be configured so as to comprise a slot 706 formed in the enlarged head 702 that is configured to accommodate the wrench 800. More specifically, the slot 706 may be sized and positioned such that the openings 804 are configured to receive the enlarged head 702 and the slat 806 may engage the slot 706. In this way, the wrench 806 may engage the fastener 210 such that rotation of the wrench causes the fastener 210 to likewise rotate. The slots 706 may additionally or alternatively be configured to permit a user to tighten the fastener 210 with a coin or other flat object should a wrench 800 not be available. Using these options to apply a tightening force to the fastener 210 allows a user to easily make adjustments to the position of the action camera 100 and securely tighten the fasteners to secure the position of the action camera 100 even if the user does not have the wrench 800 available.

Embodiments of the invention are generally fabricated from rigid materials such as, but not limited to, aluminum and steel. Other embodiments may be fabricated from other materials such as fiber reinforced plastic as long as these materials are sufficiently durable so as to prevent the raised mounting ridges 504 used to prevent the mounting arm from rotating and becoming damaged. Rigid materials also permit the user to apply a greater amount of force to the fasteners without risking damage to the arm 202 or brackets (204 and 206).

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for mounting an action camera to a protrusion comprising:
a fastener comprising a head configured to fit within an aperture of a wrench, a series of facets configured to permit hand or finger tightening of the fastener, and a slot extending the diameter of the head, wherein said slot is configured to accept a slat of said wrench, and wherein said slat spans the aperture of said wrench;
a mounting arm configured to be directly secured to an action camera housing in a manner which permits hinging movement of said action camera, wherein said mounting arm comprises a first opening configured to accommodate the fastener;
an upper bracket comprising a second opening positioned for alignment with the first opening and configured to accommodate the fastener; and
a lower bracket configured to be selectively secured to the upper bracket;
wherein the upper bracket and the lower bracket are configured to surround and frictionally engage the protrusion.

2. The device of claim 1 further comprising:
a raised portion on said upper bracket, wherein said second opening extends through the raised portion.

3. The device of claim 2 further comprising:
a number of engagement ridges located on the raised portion and surrounding the second opening; and
a number of mating ridges located on the mounting arm and surrounding the first opening;
wherein the engagement ridges and the mating ridges are configured to frictionally engage one another.

4. The device of claim 1 wherein:
the second opening comprises threads configured to engage the fastener.

5. The device of claim 1 further comprising:
a third opening located on the upper bracket configured to accommodate a second fastener;
a fourth opening located on the upper bracket configured to accommodate a third fastener;
a fifth opening located on the lower bracket configured to accommodate the second fastener; and
a sixth opening located on the lower bracket configured to accommodate the third fastener;
wherein the third opening is positioned to align with the fifth opening such that the second fastener is extendable through the third and fifth openings to secure the upper bracket to the lower bracket;
wherein the fourth opening is positioned to align with the sixth opening such that the second fastener is extendable through the fourth and sixth openings to secure the upper bracket to the lower bracket.

6. The device of claim 5 wherein:
the fifth opening comprises threads configured to engage the second fastener; and
the sixth opening comprises threads configured to engage the third fastener.

7. The device of claim 1 wherein:
the second fastener comprises a second head comprising a second series of facets configured to permit hand or finger tightening of the second fastener and a second slot extending the diameter of the second head and configured to accept the slat of said wrench; and
the third fastener comprises a third head comprising a third series of facets configured to permit hand or finger tightening of the third fastener and a third slot extending the diameter of the third head and configured to accept the slat of said wrench.

8. The device of claim 1 wherein:
the upper and lower brackets form a substantially circular shape when connected to one another.

9. The device of claim 8 wherein:
the protrusion is a handle bar of a bicycle or motorcycle.

10. A system for mounting an action camera to a protrusion comprising:
a fastener comprising:
a fastener head,
a shank extending from the fastener head,
a series of facets located in the fastener head and configured to permit hand or finger tightening of the fastener, and
a slot extending the diameter of the fastener head configured to accommodate a mounting tool;
a mounting arm configured to be secured to the action camera and comprising a first opening configured to accommodate the fastener;
an upper bracket comprising a second opening positioned for alignment with the first opening and configured to accommodate the fastener; and
a lower bracket configured to be selectively secured to the upper bracket;
wherein the upper bracket and the lower bracket are configured to surround and frictionally engage the protrusion
wherein the mounting tool comprises a wrench, said wrench comprising:
a handle;
a wrench head;
a first and second wrench openings in said wrench head; and
a slat defined by said first and second wrench openings and configured to engage the slot.

11. The system of claim 10 wherein:
said slot is further configured to accept a coin.

12. The system of claim 11 wherein:
the shank is threaded; and
a second opening comprises threads configured to engage the threads on the shank of the fastener.

13. The system of claim 12 further comprising:
a third opening located on the upper bracket configured to accommodate a second fastener;
a fourth opening located on the upper bracket configured to accommodate a third fastener;
a fifth opening located on the lower bracket configured to accommodate the second fastener; and
a sixth opening located on the lower bracket configured to accommodate the third fastener;
wherein the third opening is positioned to align with the fifth opening such that the second fastener is extendable through the third and fifth openings to secure the upper bracket to the lower bracket;
wherein the fourth opening is positioned to align with the sixth opening such that the second fastener is extendable through the fourth and sixth openings to secure the upper bracket to the lower bracket.

14. The system of claim 13 wherein:
the fifth opening comprises threads configured to engage the second fastener;
the sixth opening comprises threads configured to engage the third fastener;
the second fastener comprises a second head comprising a second series of facets configured to permit hand or finger tightening and a second slot extending the diameter of the second head and configured to accept the slat of the wrench; and
the third fastener comprises a third head comprising a third series of facets configured to permit hand or finger tightening and a third slot extending the diameter of the third head and configured to accept the slat of the wrench.

15. The system of claim 10 further comprising:
a raised portion on said upper bracket, wherein said second opening extends through the raised portion;
a number of engagement ridges located on the raised portion and surrounding the second opening; and
a number of mating ridges located on the mounting arm and surrounding the first opening;
wherein the engagement ridges and the mating ridges are configured to frictionally engage one another.

16. A system for mounting an action camera to a protrusion comprising:
a wrench comprising:
a handle,
a wrench head,
a first and second wrench openings in said wrench head, and
a slat defined by said first and second wrench openings;
a first, second, and third fastener, each comprising:
a fastener head,
a threaded shank extending from the fastener head,
a series of facets located in the fastener head and configured to permit hand or finger tightening of the fastener, and
a slot extending the diameter of the fastener head configured to accommodate the slat of the wrench;
a mounting arm configured to be secured to the action camera and comprising a first opening configured to accommodate the first fastener;
an upper bracket comprising:
a second opening located on a raised portion, wherein the second opening is positioned for alignment with the first opening and comprises threads configured to engage the threaded shank of the first fastener,
a third opening configured to accommodate the second fastener, and
a fourth opening configured to accommodate the third fastener; and
a lower bracket comprising:
a fifth opening which is positioned for alignment with the third opening and comprises threads configured to engage the second fastener, and
a sixth opening which is positioned for alignment with the fourth opening and comprises threads configured to engage the third fastener;
wherein the upper bracket and the lower bracket are configured to surround and frictionally engage the protrusion.

17. The system of claim 16 further comprising:
a number of engagement ridges located on the raised portion and surrounding the second opening; and a number of mating ridges located on the mounting arm and surrounding the first opening;

wherein the engagement ridges and the mating ridges are configured to frictionally engage one another.

* * * * *